United States Patent
Chu

(10) Patent No.: US 7,607,676 B1
(45) Date of Patent: Oct. 27, 2009

(54) BICYCLE HANDLEBAR SHOCK ABSORBING ASSEMBLY

(76) Inventor: En-Te Chu, NO15, Lane160, Fongfu Rd., Taichung (TW)

( * ) Notice: Subject to any disclaimer, the term of this patent is extended or adjusted under 35 U.S.C. 154(b) by 85 days.

(21) Appl. No.: 12/011,756

(22) Filed: Jan. 29, 2008

(51) Int. Cl.
 *B62K 21/14* (2006.01)
(52) U.S. Cl. .................. 280/276; 74/551.2; 384/48; 464/167
(58) Field of Classification Search ............... 280/275, 280/276; 74/551.2; 384/48, 49; 188/322.16, 188/322.17, 322.18; 464/167, 169
See application file for complete search history.

(56) References Cited

U.S. PATENT DOCUMENTS

| | | | | |
|---|---|---|---|---|
| 3,989,263 A | * | 11/1976 | Stuck et al. | 280/283 |
| 4,815,763 A | * | 3/1989 | Hartmann | 280/276 |
| 5,044,648 A | * | 9/1991 | Knapp | 280/283 |
| 5,380,026 A | * | 1/1995 | Robinson | 280/276 |
| 5,494,302 A | * | 2/1996 | Farris et al. | 280/276 |
| 6,637,559 B2 | * | 10/2003 | Hoose | 188/322.16 |
| 2008/0100026 A1 | * | 5/2008 | Bouchez | 280/279 |

* cited by examiner

*Primary Examiner*—Anne Marie M Boehler
(74) *Attorney, Agent, or Firm*—Pro-Techtor Int'l Services; Ralph Willgohs

(57) ABSTRACT

A bicycle handlebar shock absorbing assembly includes a core connected with the front fork of a bicycle and a first flat surface is defined in an outside of the core. A bead sleeve is mounted to the core and includes a second flat surface in which a plurality of rollers are embedded. A resilient member has an end rested on a top of the bead sleeve. A driving tube has a recess defined in a first end thereof and a second end of the driving tube is connected with a handlebar. A third flat surface is defined in an inner periphery of the recess. The resilient member and the bead sleeve are received in the recess, the rollers are in contact with the first and third flat surfaces. The core pushes the bead sleeve upward to compress the spring when shocks are transferred from the roads.

2 Claims, 6 Drawing Sheets

BICYCLE HANDLEBAR SHOCK ABSORBING ASSEMBLY

FIELD OF THE INVENTION

The present invention relates to a bicycle handlebar shock absorbing assembly and the handlebar is able to turn the front fork precisely.

BACKGROUND OF THE INVENTION

A conventional handlebar shock absorbing assembly 80 is shown in FIG. 6 and generally includes a core 81 which is connected to the front fork (not shown) and an axial hole 811 is defined in the core 81. A bead sleeve 81 is mounted to the core 81 and includes beads 821 embedded in the wall of the bead sleeve 81. The driving tube 83 of a bicycle is mounted to the bead sleeve 81 and the bicycle handlebar (not shown) is connected to the top of the driving tube 83. An activation rod 831 is located in the driving tube 83 and an elongate member 832 is connected to a distal end of the activation rod 831, the elongate member 832 is shaped to be movably inserted into the axial hole 811 in the core 81. A spring 84 is received in the driving tube 83 and a lower end of the spring 84 is rested on the top of the bead sleeve 82. When the front fork is moved upward when ridding on a rugged road, the spring 84 is compressed so as to absorb shocks transferred from the road. The front fork together with the front wheel are driven when the driving tube 83 together with the handlebar turn.

A gap is defined between the elongate member 832 and the inner periphery of the axial hole 811 so that when the bicycle turns, the driving tube 83 and the core 81 do not rotate simultaneously. The gap also accelerates wearing between the core 81 and the elongate member 832.

The present invention intends to provide a handlebar shock absorbing assembly wherein the core and the driving tube are rotated simultaneously so that the control for turning of the bicycle is improved.

SUMMARY OF THE INVENTION

The present invention relates to a bicycle handlebar shock absorbing assembly and comprises a core having an end connected with a front fork and a first flat surface is defined in an outside of the core. A bead sleeve is mounted to the core and includes a plurality of beads embedded in a wall thereof. The bead sleeve includes a second flat surface in which a plurality of rollers are embedded, the rollers are in contact with the first flat surface. A resilient member has an end rested on a top of the bead sleeve. A driving tube has a recess defined in a first end thereof and a second end of the driving tube is connected with a handlebar. A third flat surface is defined in an inner periphery of the recess. The resilient member and the bead sleeve are received in the recess, the rollers are in contact with the third flat surface. A groove is defined in the inner periphery of the recess and a stop member is engaged with the groove such that a lower end of the bead sleeve is rested on the stop member.

The primary object of the present invention is to provide a bicycle handlebar shock absorbing assembly wherein the core, the bead sleeve and the driving tube are connected with each other by three respective flat surfaces so that the front fork turns precisely when the handlebar turns.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
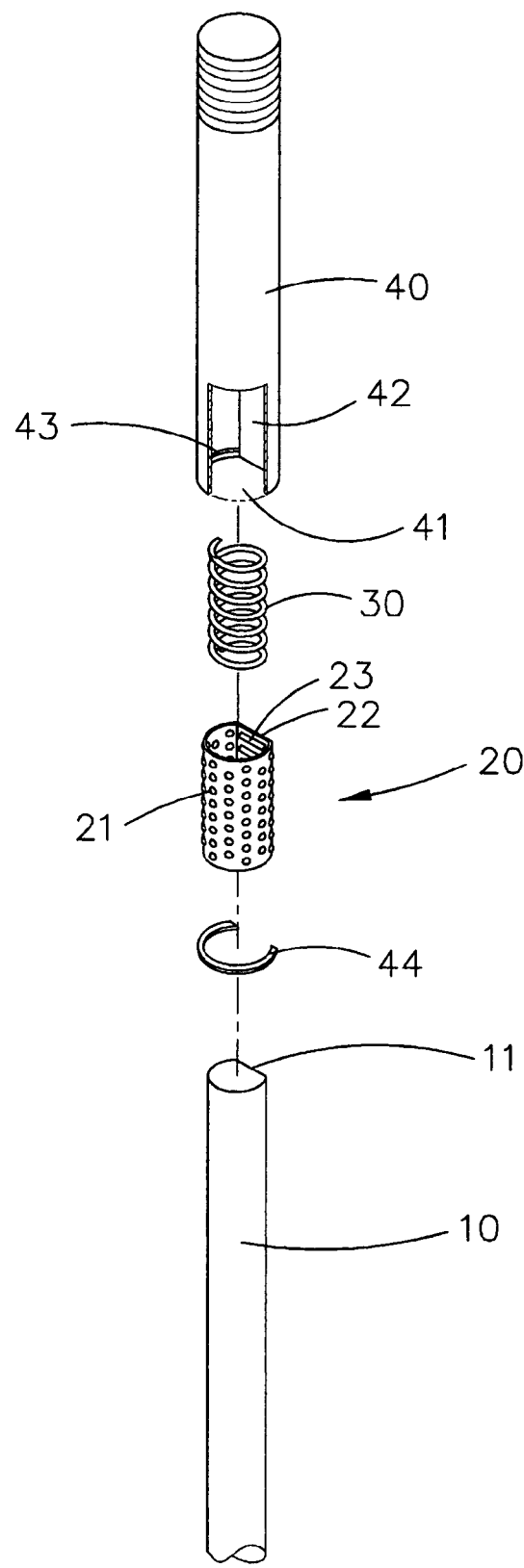
FIG. 1 is an exploded view to show the handlebar shock absorbing assembly of the present invention.
Figure 2:
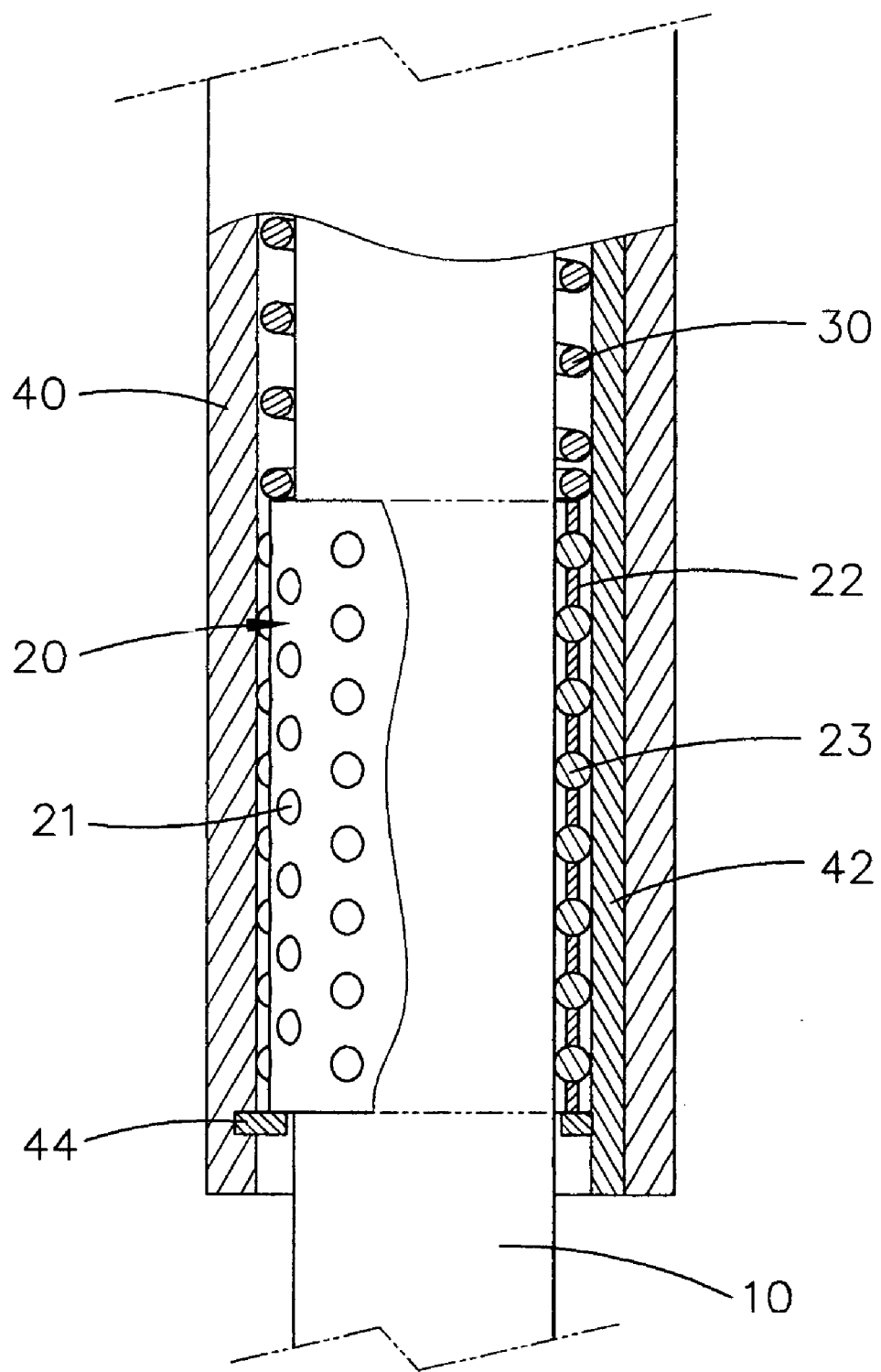
FIG. 2 is a cross sectional view to show the handlebar shock absorbing assembly of the present invention.
Figure 3:
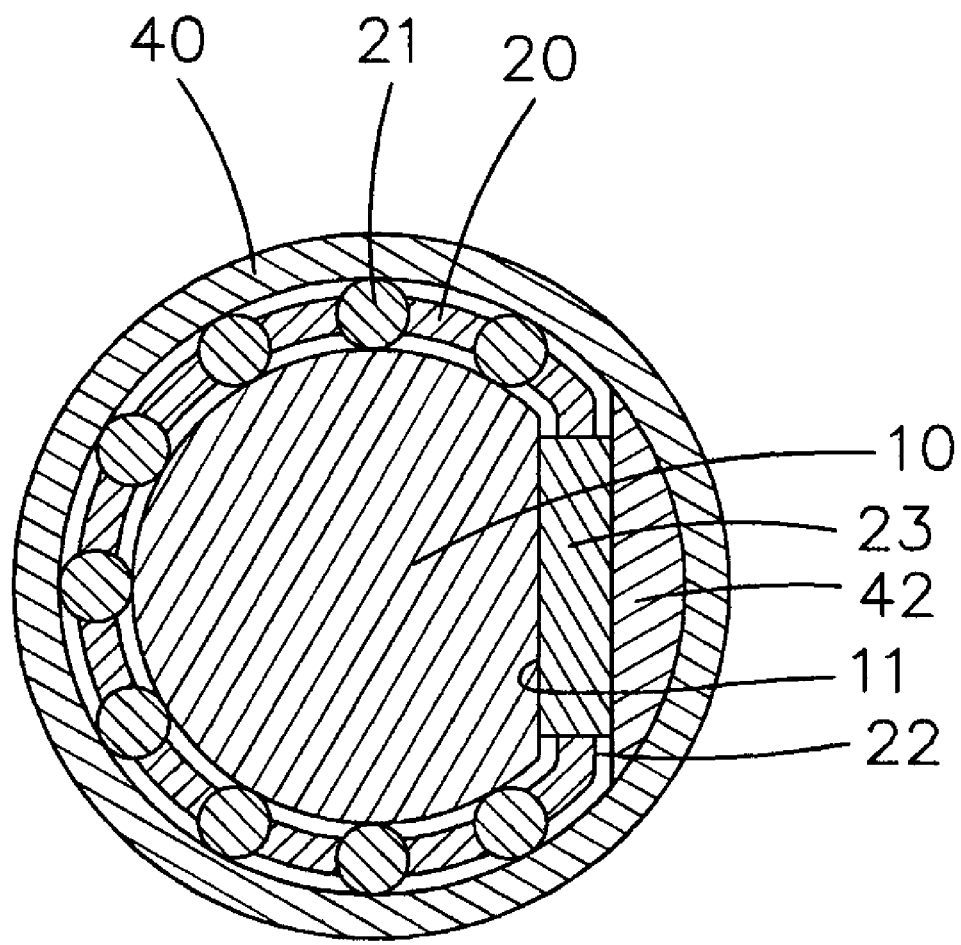
FIG. 3 is an end cross sectional view of the handlebar shock absorbing assembly of the present invention.
Figure 4:
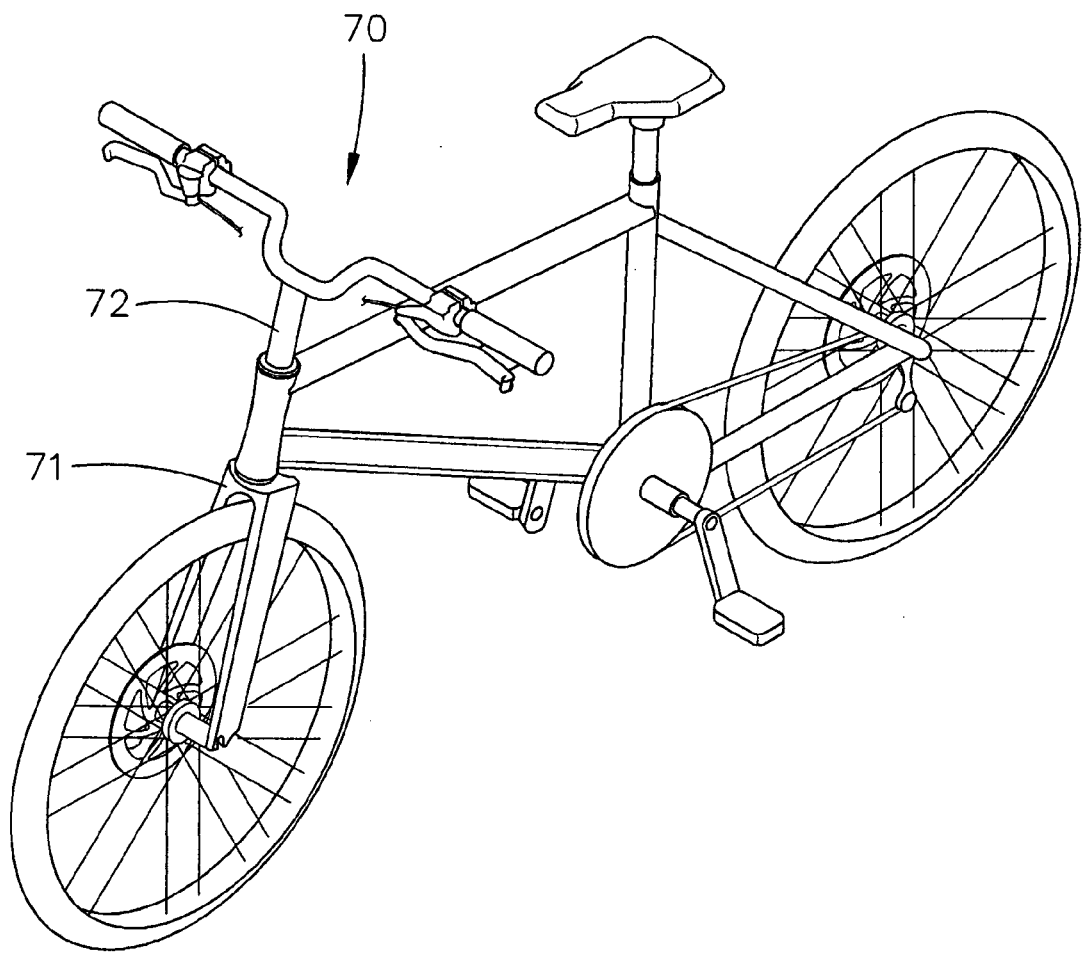
FIG. 4 shows the bicycle with the handlebar shock absorbing assembly of the present invention.
Figure 5:
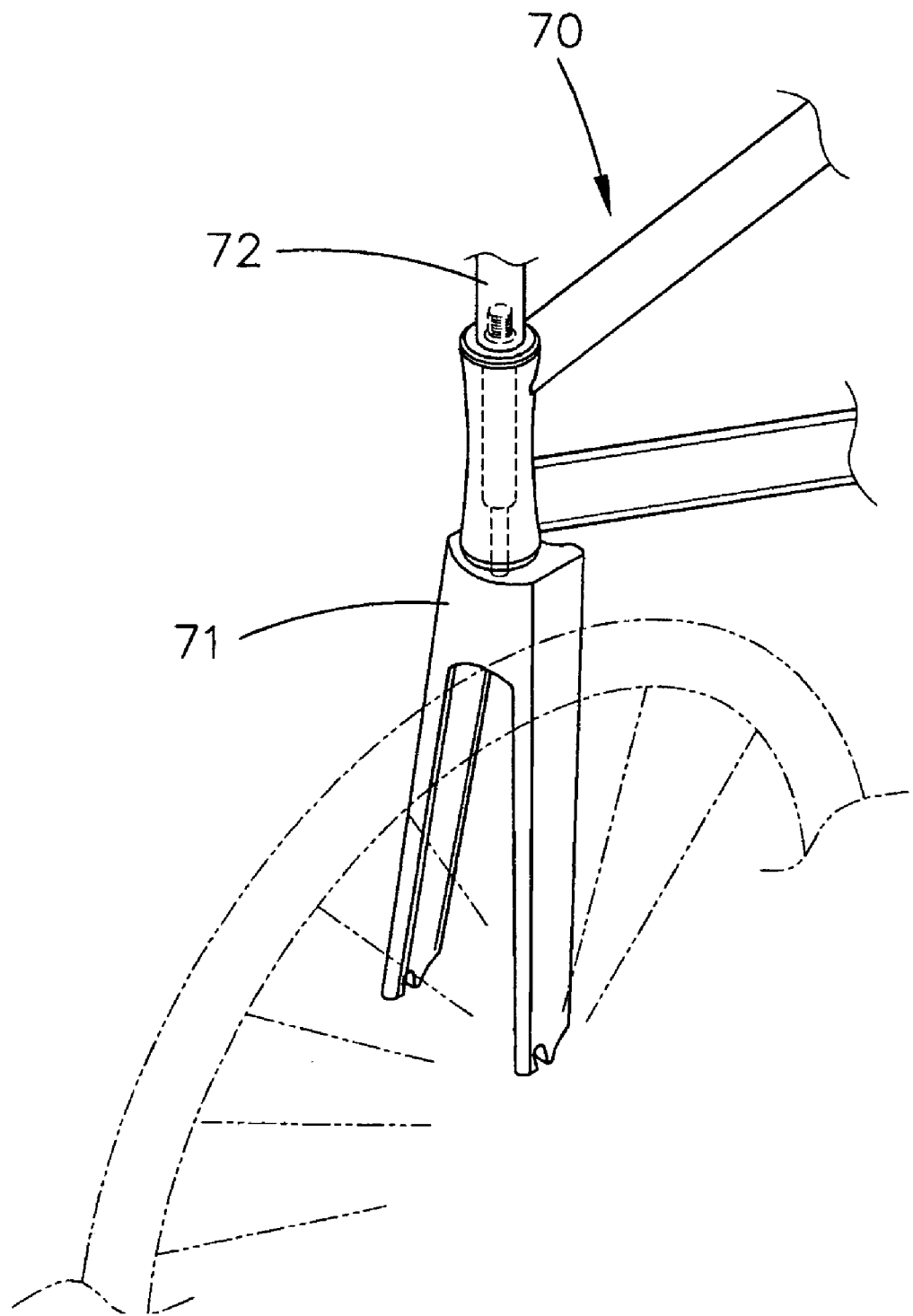
FIG. 5 shows that the handlebar shock absorbing assembly of the present invention is located in the driving tube of the bicycle.
Figure 6:
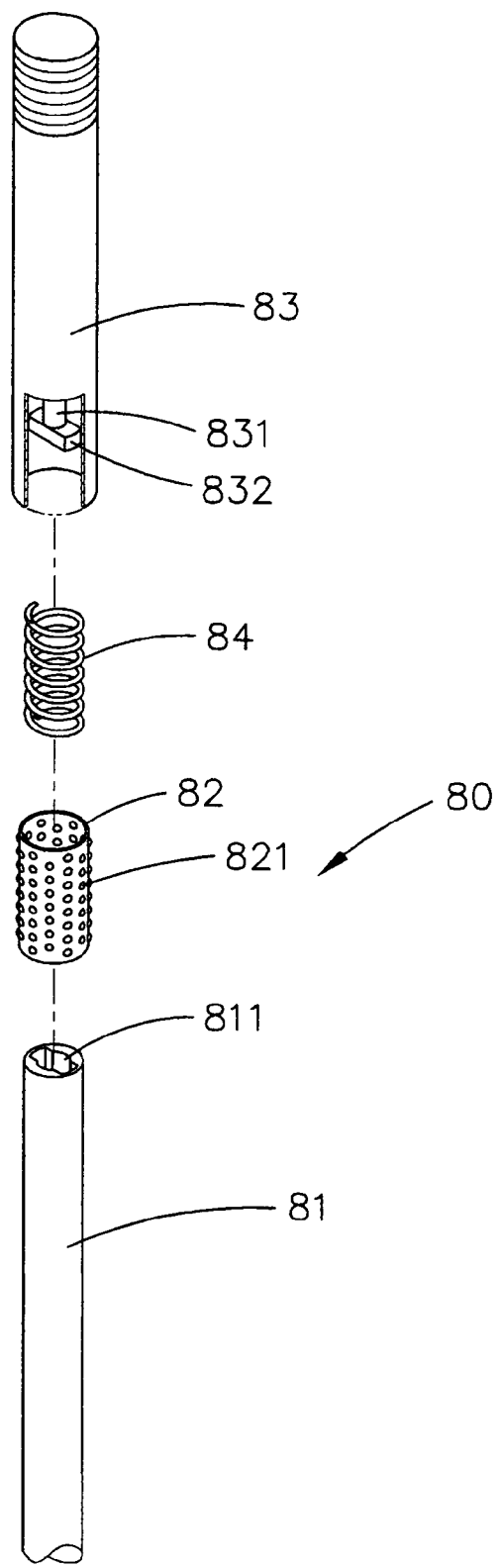
FIG. 6 is an exploded view to show a conventional handlebar shock absorbing assembly.

Referring to FIGS. 1 to 5, the bicycle handlebar shock absorbing assembly of the present invention comprises a core 10 which has an end connected with the front fork 71 of the bicycle 70 and a first flat surface 11 is defined in an outside of the core 10. A bead sleeve 20 is mounted to the core 10 and has a plurality of beads 21 embedded in a wall thereof. A second flat surface 22 is defined in an outside of the bead sleeve 20. A plurality of rollers 23 are embedded in the second flat surface 22 and in contact with the first flat surface 11 of the core 10. A resilient member 30 such as a spring has an end rested on a top of the bead sleeve 20.

A driving tube 40 has a recess 41 defined in a first end thereof and a second end of the driving tube 40 is connected with the handlebar 72 of the bicycle 70. A third flat surface 42 is defined in an inner periphery of the recess 41. The resilient member 30 and the bead sleeve 20 are received in the recess 41. The rollers 23 are in contact with the third flat surface 42. A groove 43 is defined in the inner periphery of the recess 41 and a stop member 44 is engaged with the groove 43. A lower end of the bead sleeve 20 is rested on the stop member 44.

When shocks are transferred from the road to the front fork, the front fork is moved upward to compress the spring 30 so as to absorb the shocks which are not transferred to the handlebar 72. The first flat surface 11, the second flat surface 22 and the third flat surface 42 are matched with each other with the rollers 23 located therebetween so that when the handlebar 72 turns, the driving tube 40 drives the bead sleeve 20 and the core 10 and the front fork to turn.

While we have shown and described the embodiment in accordance with the present invention, it should be clear to those skilled in the art that further embodiments may be made without departing from the scope of the present invention.

What is claimed is:

1. A bicycle handlebar shock absorbing assembly comprising:

a core having an end connected with a front fork and a first flat surface defined in an outside of the core;

a bead sleeve having a plurality of beads embedded in a wall thereof mounted to the core, a second flat surface defined in an outside of the bead sleeve, a plurality of rollers embedded in the second flat surface and being in contact with the first flat surface;

a resilient member having an end rested on a top of the bead sleeve, and a driving tube having a recess defined in a first end thereof and a second end of the driving tube connected with a handlebar, a third flat surface defined in an inner periphery of the recess, the resilient member and the bead sleeve received in the recess, the rollers being in contact with the third flat surface, a groove defined in the inner periphery of the recess and a stop member engaged with the groove, a lower end of the bead sleeve rested on the stop member.

2. The assembly as claimed in claim 1, wherein the resilient member is a spring.

* * * * *